(12) United States Patent
Akita et al.

(10) Patent No.: US 9,373,830 B2
(45) Date of Patent: Jun. 21, 2016

(54) LITHIUM ION SECONDARY BATTERY, SEPARATOR THEREOF, AND METHOD FOR PRODUCING EACH OF SAME

(75) Inventors: Hiroyuki Akita, Seto (JP); Harunari Shimamura, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 175 days.

(21) Appl. No.: 14/368,301

(22) PCT Filed: Dec. 28, 2011

(86) PCT No.: PCT/JP2011/080430
§ 371 (c)(1),
(2), (4) Date: Jun. 24, 2014

(87) PCT Pub. No.: WO2013/099000
PCT Pub. Date: Jul. 4, 2013

(65) Prior Publication Data
US 2015/0340678 A1    Nov. 26, 2015

(51) Int. Cl.
*H01M 2/16* (2006.01)
*H01M 2/14* (2006.01)
*H01M 10/0525* (2010.01)

(52) U.S. Cl.
CPC ............ *H01M 2/1686* (2013.01); *H01M 2/145* (2013.01); *H01M 2/166* (2013.01); *H01M 10/0525* (2013.01); *Y02E 60/122* (2013.01); *Y10T 29/49114* (2015.01)

(58) Field of Classification Search
CPC .............. H01M 2/1686; H01M 2/145; H01M 10/0525; H01M 2/166
See application file for complete search history.

(56) References Cited

U.S. PATENT DOCUMENTS

2002/0114993 A1  8/2002  Miyaki et al.
2007/0178384 A1  8/2007  Kajita et al.

FOREIGN PATENT DOCUMENTS

| JP | 2007-188777 | 7/2007 |
| JP | 2008-210782 | 9/2008 |
| JP | 4253853 | 4/2009 |

*Primary Examiner* — Stewart Fraser
(74) *Attorney, Agent, or Firm* — Finnegan, Henderson, Farabow, Garrett & Dunner, LLP

(57) ABSTRACT

This separator is provided at least at one surface thereof with a heat-resistant layer containing inorganic oxide particles and a binder, and the inorganic oxide particles have a component containing gallium in the range of 5 to 200 weight ppm in an aluminum oxide. This lithium ion secondary battery has: an electrode body including a positive electrode plate and a negative electrode plate laminated by interposing the separator therebetween; and a non-aqueous electrolytic solution impregnated in the electrode body. A lithium ion secondary battery using the separator having the heat-resistant layer is therefore less likely to cause a rise in resistance even in use under high-rate conditions.

8 Claims, 7 Drawing Sheets

LITHIUM ION SECONDARY BATTERY, SEPARATOR THEREOF, AND METHOD FOR PRODUCING EACH OF SAME

CROSS-REFERENCE TO RELATED APPLICATIONS

This application is a national phase application of International Application No. PCT/JP2011/080430, filed Dec. 29, 2011, the content of which is incorporated herein by reference.

TECHNICAL FIELD

The present invention relates to a lithium ion secondary battery suitable for use under high-rate conditions and more particularly to a lithium ion secondary battery including a heat-resistant layer as a separator between positive and negative electrodes, the separator, and a method for producing each of them.

BACKGROUND ART

Conventionally, a lithium ion secondary battery includes an electrode body consisting of positive electrodes and negative electrodes laminated one on the other with separators held between both electrodes. Each separator is generally a porous film made of a resin material such as polyethylene (PE) and polypropylene (PP). This is basically to prevent short circuit from occurring between the positive and negative electrodes and allow ion permeation. Further, this is to cause so-called shut-down in case a battery temperature excessively rises. The separators used herein may be a separator formed with a heat-resistant layer on one surface in order to prevent short circuit from occurring between both electrodes even at the time of shut-down.

One example of such heat-resistant layer is disclosed in Patent Document 1. This heat-resistant layer is made of plate-like boehmite and an organic binder (e.g., claim 2 of Patent Document 1). According to [0033] of Patent Document 1, it is assumed that it is advantageous to mix the plate-like boehmite in the heat-resistant layer in order to prevent short circuit. The reason thereof is explained as that plate-shaped microparticles are likely to be oriented in a fixed plane direction in a heat-resistant layer, which causes a through hole opening at both surfaces of the heat-resistant layer to take a curved or twisted, not straight, shape.

RELATED ART DOCUMENTS

Patent Documents

Patent Document 1: JP-A-2008-210782

SUMMARY OF INVENTION

Problems to be Solved by the Invention

However, the aforementioned conventional technique has the following problems. The uses of lithium ion secondary batteries are for supply of electric power to vehicle drive motors of electric cars and hybrid cars in addition to application to portable devices mentioned in [0002] of Patent Document 1. For such use for mechanical driving force generation, the batteries are more likely to be subjected to charge and discharge at high rates as compared with use in electronic devices. However, when the battery provided with the heat-resistant layer of Patent Document 1 is used under such a high-rate condition, the battery resistance remarkably increases with use. This is conceivably because mechanical pressure is applied to between electrodes during charge and discharge at high rates. This pressure increase causes fracture of plate-like boehmite in the heat-resistant layer, generating microparticles. Thus, those microparticles clog up pores of the heat-resistant layer. This decreases ion migration paths and increases the battery resistance.

The present invention has been made to solve the above problems of the conventional techniques and has a purpose to provide a lithium ion secondary battery including a separator with a heat-resistant layer and being less likely to increase resistance even in use under high-rate conditions, the separator, and a method for producing each of them.

Means of Solving the Problems

To achieve the above purpose, one aspect of the invention provides a lithium ion secondary battery comprising an electrode body including a positive electrode sheet and a negative electrode sheet laminated by interposing a separator therebetween, and a non-aqueous electrolytic solution impregnated in the electrode body, the positive electrode sheet having active material containing lithium complex oxide, and the non-aqueous electrolytic solution containing lithium ions. Further, the separator has a heat-resistant layer containing inorganic oxide particles and a binder on at least one surface, and the inorganic oxide particles have a component containing gallium in a range of 5 to 200 weight ppm in aluminum oxide.

In the above lithium ion secondary battery, the inorganic oxide particles in the heat-resistant layer of the separator are made of aluminum oxide containing an appropriate quantity of gallium. This gallium inclusion produces an effect to extremely enhance hardness of the inorganic oxide particles. Accordingly, in the above lithium ion secondary battery, the inorganic oxide particles are less likely to fracture even when the battery is subjected to high-rate charge and discharge. Thus, the battery resistance increases less. Herein, the "aluminum oxide" corresponds to at least alumina and boehmite.

A separator in an aspect of the invention is the separator in the above lithium ion secondary battery. Specifically, the separator is to be laminated together with the positive electrode sheet and the negative electrode sheet of the lithium ion secondary battery to form an electrode body, wherein the separator includes a heat-resistant layer containing inorganic oxide particles and a binder on at least one surface, and the inorganic oxide particles have a component containing gallium in a range of 5 to 200 weight ppm in aluminum oxide.

The above lithium ion secondary battery is produced by a step of forming a heat-resistant layer containing inorganic oxide particles and a binder on at least one surface of a base film of a separator; a step of producing an electrode body by laminating the positive electrode sheet and the negative electrode sheet by interposing therebetween the separator formed with the heat-resistant layer; and a step of placing the electrode body in a battery case and injecting a non-aqueous electrolytic solution into the battery case. The inorganic oxide particles used herein have a component containing gallium in a range of 5 to 200 weight ppm in aluminum oxide.

The above separator is produced by a step of forming a heat-resistant layer containing inorganic oxide particles and a binder on at least one surface of a base film of the separator. The inorganic oxide particles used herein have a component containing gallium in a range of 5 to 200 weight ppm in aluminum oxide.

Herein, the gallium contained in the inorganic oxide particles is preferably segregated in a crystal grain boundary of aluminum oxide. This is because the effect of increasing the hardness of the inorganic oxide particles can be more excellently obtained by grain boundary segregation of gallium. Therefore, the inorganic oxide particles are preferably subjected to an annealing treatment before subjected to the step of forming the heat-resistant layer. This is because the annealing treatment makes the contained gallium to be segregated in the crystal grain boundary of the aluminum oxide.

Effects of the Invention

According to the invention, a lithium ion secondary battery using a separator having a heat-resistant layer and being less likely to cause resistance increase even in use under high-rate conditions, the separator, and a method for producing them.

REFERENCE SIGNS LIST

22 Positive electrode sheet
23 Negative electrode sheet
24 Separator
102 Electrode wound body (Electrode body)
120 Electrode wound body (Electrode body)
130 Electrolytic solution
241 Heat-resistant layer

MODE FOR CARRYING OUT THE INVENTION

Figure 1:
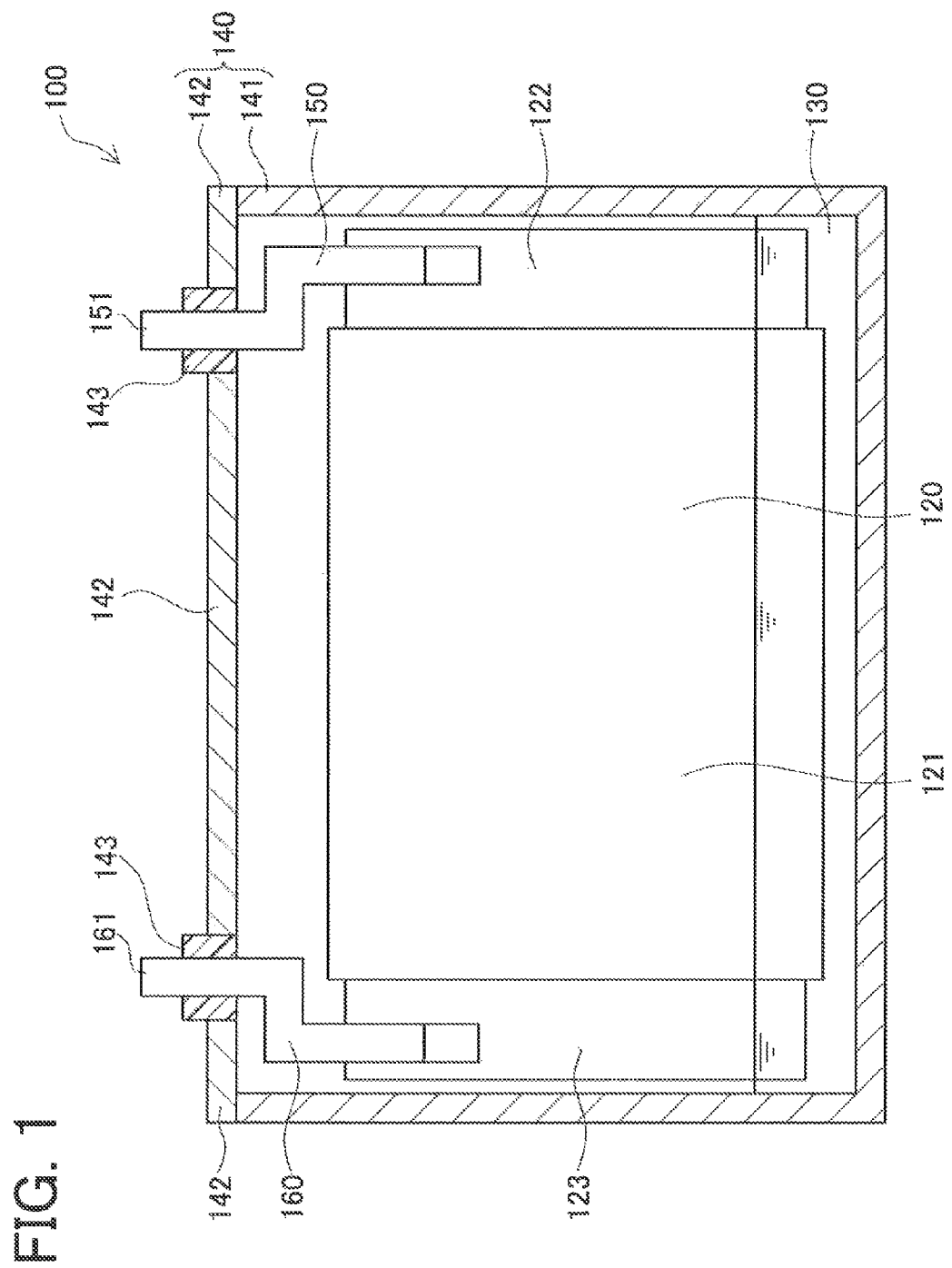
FIG. 1 is a cross sectional view of a lithium ion secondary battery (a flat type) of an embodiment.

A detailed description of an embodiment of the present invention will now be given referring to the accompanying drawings. In the present embodiment, the invention is applied to a battery shown in a cross sectional view of FIG. 1. The battery 100 in FIG. 1 is a lithium ion secondary battery including an electrode wound body 120 placed in a battery case 140. This case 140 forms the outer shape of the battery 100 and has a flat rectangular shape. The case 140 contains an electrolytic solution 130 in addition to the electrode wound body 120. A part of the electrode wound body 120 is immersed in the electrolytic solution 130. A part of the electrolytic solution 130 is therefore impregnated in the electrode wound body 120. It is to be noted that the electrolytic solution 130 is a non-aqueous electrolytic solution containing lithium ions.

Figure 2:
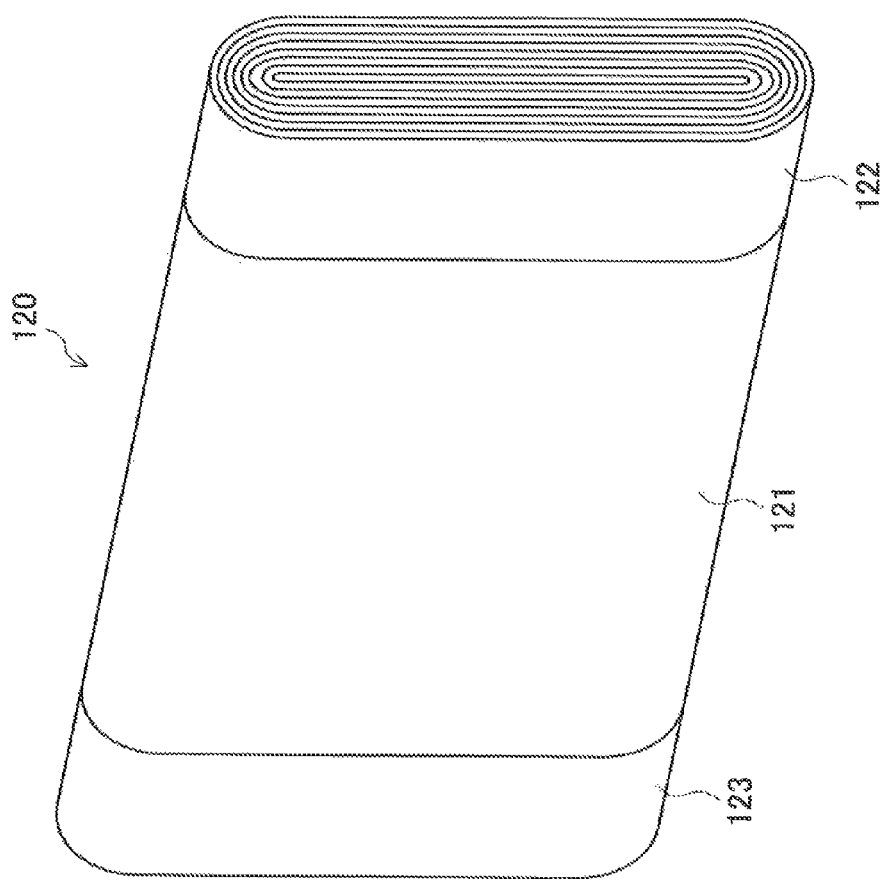
FIG. 2 is a perspective view of an electrode wound body (a flat type) of the lithium ion secondary battery.

The electrode wound body 120 is formed by winding a positive electrode sheet, a negative electrode sheet, and separators in a lamination form and has a flattened shape as shown in FIG. 2. In the electrode wound body 120, as shown in an enlarged cross sectional view of FIG. 3, the positive electrode sheet 22 and the negative electrode sheet 23 are laminated by interposing the separators 24 therebetween.

Figure 3:
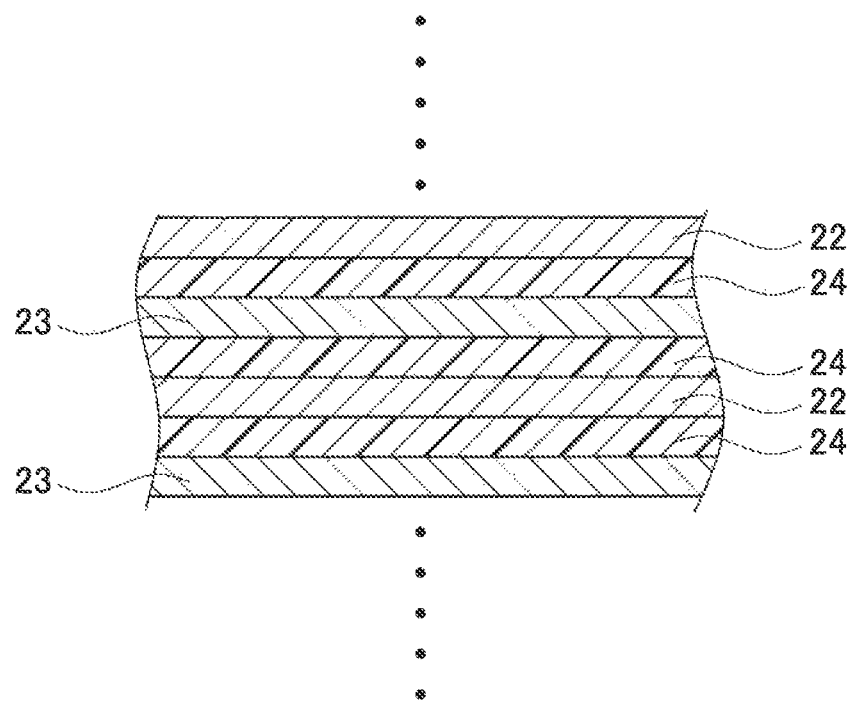
FIG. 3 is an enlarged cross sectional view of the electrode wound body.

Returning to FIG. 2, the electrode wound body 120 has a charge-storing part 121 located in the center in a winding axial direction and a positive electrode end part 122 and a negative electrode end part 123 located on both sides of the charge-storing part 121. The charge-storing part 121 is a section in which the positive electrode sheet 22, negative electrode sheet 23, and separators 24 are all wound and in which battery reaction occurs. FIG. 3 shows an enlarged cross sectional view of the charge-storing part 121. The positive electrode end part 122 is a part in which only the positive electrode sheet 22 is wound. The negative electrode end part 123 is a part in which only the negative electrode sheet 23 is wound. Each of the positive electrode sheet 22 and the negative electrode sheet 23 is made of a current collecting foil formed with active material layers so that the active material layers are located only in each area corresponding to the charge-storing part 121. The active material layers of the positive electrode sheet 22 contain lithium complex oxide as active material. The active material layers of the negative electrode sheet 23 contain graphite as active material.

Returning to FIG. 1, the battery case 140 includes a case body 141 and a lid member 142. The positive electrode end part 122 of the electrode wound body 120 is connected to a positive terminal member 150. The negative electrode end part 123 is connected to a negative terminal member 160. The positive terminal member 150 and the negative terminal member 160 partially extend out of the battery case 140 through the lid member 142 and respectively form a positive external terminal 151 and a negative external terminal 161. Insulating seal members 143 are provided one each between the lid member 142 and the positive terminal member 150 and between the lid member 142 and the negative terminal member 160.

Figure 4:
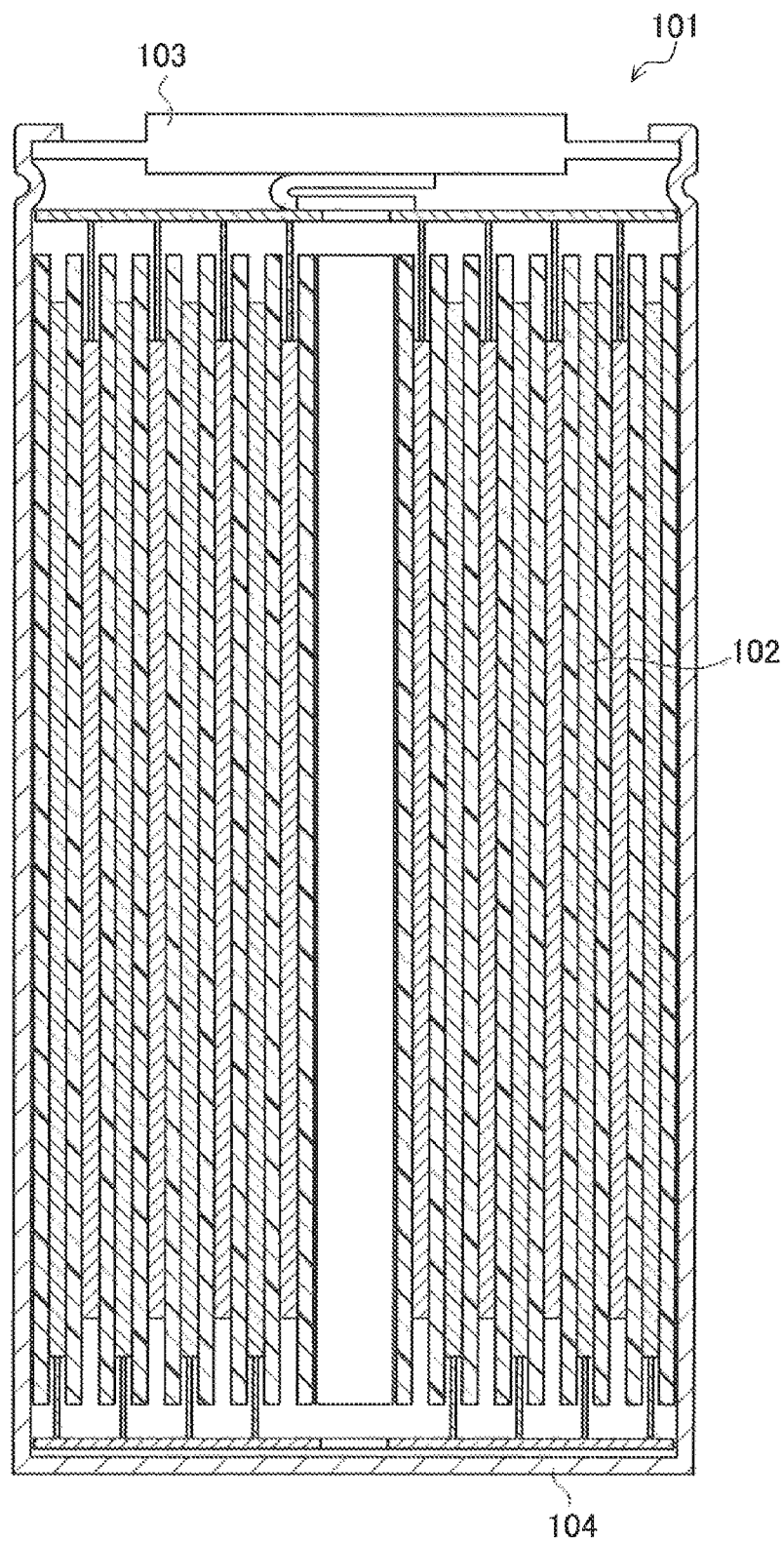
FIG. 4 is a cross sectional view of a lithium ion secondary battery (a cylindrical type) of the embodiment.
Figure 5:
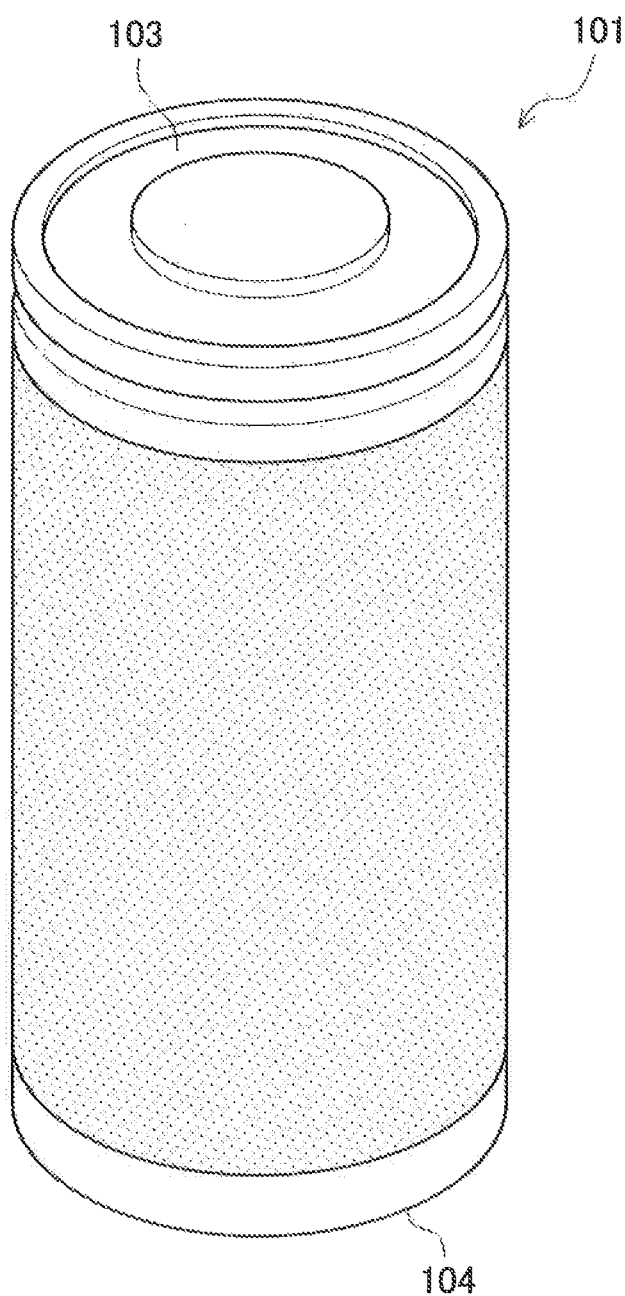
FIG. 5 is a perspective view of an electrode wound body (a cylindrical type) of the lithium ion secondary battery.

The present embodiment can also be applied to a cylindrical battery 101 shown in FIGS. 4 and 5. For the cylindrical battery 101, an electrode wound body 102 is also cylindrical. A can lid 103 and a can bottom 104 serve as positive and negative external terminals.

Figure 6:
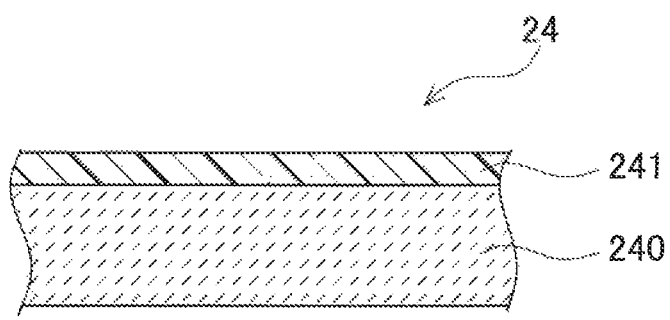
FIG. 6 is a cross sectional view of a separator of the embodiment.

The separator 24 in the present embodiment is made of a base film 240 having a surface formed with a heat-resistant layer 241 as shown in FIG. 6. The base film 240 is a porous film made of resin material. This resin material is preferably polyolefin resin; concretely, a polyethylene(PE) single-layer film or a polypropylene(PP)-polyethylene-polypropylene three-layer lamination film is commonly used. In the case of using the polyethylene single-layer film, the heat-resistant layer 241 is provided on a surface which will face the positive electrode sheet 22. In the case of using the polypropylene-polyethylene-polypropylene three-layer lamination film, the heat-resistant layer 241 may be provided in either surface. Alternatively, the heat-resistant layer 241 may be provided on both surfaces.

The heat-resistant layer 241 is a layer made of deposited filler particles. As the filler, there is used inorganic oxide powder such as alumina (oxidized aluminum) or boehmite (oxidized aluminum hydrate). The heat-resistant layer 241 also contains a binder in addition to the filler. The binder is selectable from resin materials such as acrylic, SBR (styrene-butadiene rubber), polyolefin, and fluorine resin. The heat-resistant layer 241 is a layer formed in such a manner that a paste prepared by kneading the filler and the binder is applied to a surface of the base film 240. At the time of kneading, a thickener may be further added to the filler and the binder.

In the present embodiment, inorganic oxide particles of the filler used herein contain gallium. A content of the gallium is determined in a range of 5 to 200 weight ppm. Containing the gallium can provide the effect of increasing the hardness of filler particles. Accordingly, even when the battery 100 is used under high-rate conditions, the filler particles are less likely to be broken. This results in enhanced battery performance. In particular, when the filler particles are subjected to the annealing treatment at high temperatures, the above effect can be more strongly obtained. This is because gallium is segregated in the crystal grain boundary in the filler particles by the annealing treatment.

Various materials used for producing the battery 100 in the present embodiment are concretely as below.

[Separator with Heat-Resistant Layer]

Base film: A PE single-layer porous film, 20 μm in thickness, was used.

As an alternative, the PP-PE-PP three-layer porous film may be used as above.

Filler: Alumina particles or boehmite particles, containing gallium, were used.

Alumina particles with D50 in a range from 0.2 to 1.2 μm and BET in a range from 1.3 to 100 $m^2/g$ or boehmite particles with D50 in a range from 0.2 to 1.8 μm and BET in a range from 2.8 to 100 $m^2/g$ were used.

Binder: An acrylic binder was used.

As an alternative, any binder made of SBR, polyolefin, or fluorine resin may be also used as above.

Thickener: CMC (carboxymethyl cellulos) was used.

As an alternative, MC (methyl cellulose) or NMP (N-methyl-2-pyrolidone) may be used.

For the above filler, the terms "D50" and "BET" represent the following meanings. The term "D50" is an index related to particles diameter and represents that 50% or more of particles by weight ratio have particle diameters in the range set as above. Herein, the particles having diameters in the above range based on measured values by a particle size distribution analyzer LA-920 by HORIBA, Ltd. were used. The term "BET" represents a surface area ratio of particles (surface area per weight). Herein, the particles having surface area ratio in the above range based on measured values by a BET surface area and porosimetry analyzer ASAP2010 by Micromeritics Instrument Corporation were used.

[Positive Electrode Sheet]

Active material: NCM111 (lithium nickel cobalt manganese composite oxide)

Conducting material: Acetylene black

Binder: PVdF (polyvinylidene fluoride)

Current collecting foil: Aluminum foil (15 μm in thickness)

Deposition weight per unit area: 9.8 to 15.2 $mg/cm^2$

Density of active material layer: 1.8 to 2.4 $g/cm^3$

[Negative Electrode Sheet]

Active material: Amorphous-coated graphite

Conducting material: SBR

Binder: CMC

Current collecting foil: Copper foil (10 μm in thickness)

Deposition weight per unit area: 4.8 to 10.2 $mg/cm^2$

Density of active material layer: 0.8 to 1.4 $g/cm^3$

[Electrolyte Solution]

Electrolyte: $LiPF_6$

Solvent: Mixed solution (ethylene carbonate:ethylmethyl carbonate:dimethyl carbonate=3:4:3)

[Production Process]

A method for producing the battery 100 in the present embodiment is executed by the following steps.

1. Producing the electrode sheets and the separators
↓
2. Producing the electrode wound body
↓
3. Placing the electrode wound body in the battery case and Injecting a liquid.

The steps 2 and 3 are identical to those conventionally performed. The step 1 is identical to that conventionally performed for production of an electrode sheet. Therefore, their details are omitted and only the production of separators is explained below. The production of separators in the step 1 is performed by the following steps. After coating, the separators are subjected to drying and then winding.

1-1. Kneading the filler particles and the binder
↓
1-2. Coating the kneaded paste to a base film 1-1. Kneading Kneading machine: Ultrasonic dispersing machine "CLEAR MIX" by M Technique Co., Ltd.

Compounding ratio: Filler:Binder:Thickener=96.7:2.6:0.7 (weight ratio)

Kneading time: Pre-kneading (15000 rpm) for 5 min.+ Main kneading (20000 rpm) for 15 min.

1-2. Coating

Coating method: Gravure coating

Gravure roll: The number of lines: 100/25.4 mm, Cell volume: 19.5 $cm^3/m^2$

Coating speed: Line speed: 3 m/min., Roll speed: 3.8 m/min.

(Speed ratio; 1:1.27)

Examples

Examples experimentally showing the advantageous effects of the present invention will be explained below. Each of the following examples was carried out to examine two items; Vickers Hardness (HV) of the filler and Resistance increasing rate of the batteries.

[Vickers Hardness (HV) of Filler]

Measurement using a micro-Vickers hardness tester was conducted. For this purpose, the filler inorganic oxide was prepared in a block-like or massive form. The block-like inorganic oxide was subjected to measurement of Vickers hardness and, after this measurement, crushed into fine particles with particle diameters described in the above paragraph entitled "[Separator with heat-resistant layer]" and subjected to kneading. A higher value of Vickers hardness of the filler, i.e., the harder hardness is more preferable. Because the filler made of harder material is less likely to be broken even under pressure corresponding to that in use at high-rates.

[Resistance Increasing Rate]

The cylindrical battery 101 with '18650' size (18 mm in diameter×65 mm in length) was produced by the aforementioned materials, subjected to battery resistance before and after high-rate cycle charge and discharge to calculate the resistance increasing rate at high rates. The lower resistance increasing rate is better, because this represents that the battery performance less decreases even when the battery is subjected to high-rate charge and discharge. The size of electrode sheets used to produce the above battery is as below.

Positive electrode sheet: 80 to 90 μm in thickness, 220 to 230 mm in electrode sheet length, and 50 to 55 mm in electrode sheet width Negative electrode sheet: 70 to 80 μm in thickness, 290 to 300 mm in electrode sheet length, and 55 to 60 mm in electrode sheet width The details of the high-rate cycle are as below.
Charge: 1.05 amp×40 seconds
Discharge: 4.2 amp×10 seconds
Interval between Charge and Discharge: 5 seconds each
Measurement temperature: 25° C.
Number of cycles: 5000 cycles

TABLE 1

Boehmite, Unannealed

| No. | Ga Content | HV | Resistance Increasing Rate | Evaluation |
|---|---|---|---|---|
| 1 | 0 | 583 | 27 | x |
| 2 | 2 | 592 | 25 | x |
| 3 | 5 | 637 | 15 | o |
| 4 | 20 | 645 | 14 | o |
| 5 | 50 | 649 | 13 | o |
| 6 | 100 | 654 | 11.5 | o |
| 7 | 160 | 657 | 10 | o |
| 8 | 200 | 667 | 9.5 | o |
| 9 | 300 | 588 | 26 | x |

Table 1 shows measurement results of an example using boehmite as the kind of inorganic oxide particles of the filler. In the example shown in Table 1, the annealing treatment which will be described later was not carried out. The numeral in the column "No." in Table 1 represents the number given to a sample. The column "Ga Content" represents a gallium content in the inorganic oxide particles in each sample number in terms of weight ppm. This measurement used an ICP (Inductively Coupled Plasma) emission spectral analyzer iCAP6300 by Thermo Fisher Scientific Inc. The column "HV" indicates measurement values of Vickers hardness of filler. The column "Resistance Increasing Rate" indicates an increasing rate of battery resistance represented by the following expression.

$$\text{Resistance increasing rate (\%)} = \frac{\text{Resistance after high-rate cycle} \times 100}{\text{Resistance before high-rate cycle}} - 100 \quad \text{(Expression 1)}$$

Referring to Table 1, the sample No. 1 is zero in Ga content, that is, No. 1 is a comparative example containing no gallium. In this sample No. 1, HV is 583 and the resistance increasing rate is 27. The resistance increasing rate being 27 means that the battery resistance after high-rate cycle increased to 1.27 times larger than the battery resistance before high-rate cycle.

In contrast, samples No. 2 to No. 9 each containing gallium increased in HV and decreased in resistance increasing rate than the sample No. 1. In other words, each sample changed for the better in both HV and resistance increasing rate owing to inclusion of gallium. However, the samples No. 2 (Ga content: 2 weight ppm) and No. 9 (Ga content: 300 weight ppm) merely changed in both HV and resistance increasing rate in an improvement range to the extent hardly different from errors.

Remaining six samples No. 3 (Ga content: 5 weight ppm) to No. 8 (Ga content; 200 weight ppm) changed in both HV and resistance increasing rate in an improvement range to the extent considered as a significant change. In Table 1 with the column "Evaluation", accordingly, the samples Nos. 1, 2, and 9 are judged as bad (x) and the samples Nos. 3 to 8 are judged as good (o). As for HV, a value in the order of 620 to 630 can be set as a threshold. As for resistance increasing rate, a value in the order of 20% can be set as a threshold.

The reason why the six samples with the gallium content in a range of 5 to 200 weight ppm exhibited good results is conceivably because an appropriate quantity of gallium was contained in each filler. Specifically, since the boehmite containing an appropriate quantity of gallium is harder than the boehmite containing no gallium, the former is larger in HV than the latter. This is conceivably because foreign atoms, i.e., gallium atoms, are present in the boehmite crystals and thus movement of dislocation in the boehmite crystals is inhibited. In the battery 100 using such boehmite as the filler, the battery resistance does not increase so much even in use under the high-rate conditions. This is because the filler is hard and thus the filler is not fractured even when the internal pressure increases during use at high-rate and will not clog up pores of the heat-resistant layers 241 of the separators 24.

The sample No. 1 containing no gallium and the sample No. 2 with the gallium content of less than 5 weight ppm could not provide the above effect. In contrast, the sample No. 9 with the gallium content exceeding 200 weight ppm also could not provide remarkable improvement in both HV and resistance increasing rate. This is conceivably because of embrittlement resulting from cracks caused by excessively contained gallium. This embrittlement cancels out the effect of inhibiting dislocation movement. Furthermore, the gallium atoms are exposed at the cracked surface of particles and therefore the gallium reacts with lithium ions on the negative electrode side. The products resulting from the reaction also become a factor of increasing the battery resistance.

Table 2 shows measurement results of an example using alumina as the kind of inorganic oxide particles of filler. In the example shown in Table 2, the annealing treatment mentioned later was not carried out. The columns "No.", "Ga content", "HV", "Resistance increasing rate", and "Evaluation" represent the same meanings as those in Table 1. The relationship between "No." and "Ga content" is also the same as that in Table 1. The same applies to Tables 3 and 4 mentioned later.

Table 2 also reveals that six samples with the gallium content in a range of 5 to 200 weight ppm exhibited significantly-better results in both HV and resistance increasing rate than the sample No. 1 containing no gallium. In contrast, the sample No. 1 containing no gallium, the samples No 2 with an insufficient gallium content, and the sample No. 9 with an excessive gallium content could not provide the above effect. The reason why the above effect could be achieved depending on the gallium content is the same as explained for Table 1. A threshold of HV for alumina can be set to a value in the order of 1600. A threshold of resistance increasing rate can be set to a value in the order of 4%.

TABLE 2

Alumina, Unannealed

| No. | Ga Content | HV | Resistance Increasing Rate | Evaluation |
|---|---|---|---|---|
| 1 | 0 | 1500 | 5 | x |
| 2 | 2 | 1522 | 4.8 | x |
| 3 | 5 | 1638 | 3 | o |
| 4 | 20 | 1659 | 3.1 | o |
| 5 | 50 | 1668 | 3 | o |
| 6 | 100 | 1681 | 2.9 | o |
| 7 | 160 | 1690 | 2.7 | o |
| 8 | 200 | 1716 | 2.5 | o |
| 9 | 300 | 1513 | 4.9 | x |

In the present embodiment, better effects can be obtained by the filler subjected to the annealing treatment. This is because gallium atoms in the filler are segregated in the grain boundary while a high temperature is kept, thereby further increasing the hardness of filler. This annealing treatment has to be performed prior to at least kneading. If the annealing treatment is performed after kneading, e.g., after coating or winding, other portions such as the base film may be damaged by heat.

When the hardness measurement is to be performed as in the present example, block-like oxide at a stage before crushing is subjected to the annealing treatment. When the block-like oxide having been subjected to the annealing treatment is subjected to the micro-Vickers hardness measurement and to crushing and subsequent steps, the effect of the annealing treatment at the HV and resistance increasing rate values can be ascertained. In a case where the hardness is not measured in a mass production line, powder filler after crushing may undergo the annealing treatment.

Tables 3 and 4 show measurement results of examples subjected to the annealing treatment. Table 3 shows the example using boehmite as the kind of inorganic oxide particles of filler and Table 4 shows the example using alumina. Tables 3 and 4, as with Tables 1 and 2, reveal that six samples with the gallium content in a range of 5 to 200 weight ppm exhibited significantly-better results in both HV and resistance increasing rate. In contrast, remaining three samples could not provide good results.

TABLE 3

Boehmite, Annealed (300° C. × 12 hours)

| No. | Ga Content | HV | Resistance Increasing Rate | Evaluation |
|---|---|---|---|---|
| 1 | 0 | 583 | 27 | x |
| 2 | 2 | 587 | 24 | x |
| 3 | 5 | 700 | 9 | o |
| 4 | 20 | 707 | 8.4 | o |
| 5 | 50 | 709 | 8.2 | o |
| 6 | 100 | 726 | 7.9 | o |
| 7 | 160 | 743 | 7.5 | o |
| 8 | 200 | 754 | 7 | o |
| 9 | 300 | 612 | 22 | x |

TABLE 4

Alumina, Annealed (900° C. × 12 hours)

| No. | Ga Content | HV | Resistance Increasing Rate | Evaluation |
|---|---|---|---|---|
| 1 | 0 | 1500 | 5 | x |
| 2 | 2 | 1559 | 4.7 | x |
| 3 | 5 | 1900 | 1.8 | o |
| 4 | 20 | 1920 | 1.5 | o |
| 5 | 50 | 1925 | 1 | o |
| 6 | 100 | 1970 | 0.8 | o |
| 7 | 160 | 2016 | 0.5 | o |
| 8 | 200 | 2047 | 0.4 | o |
| 9 | 300 | 1573 | 4.5 | x |

Figure 7:
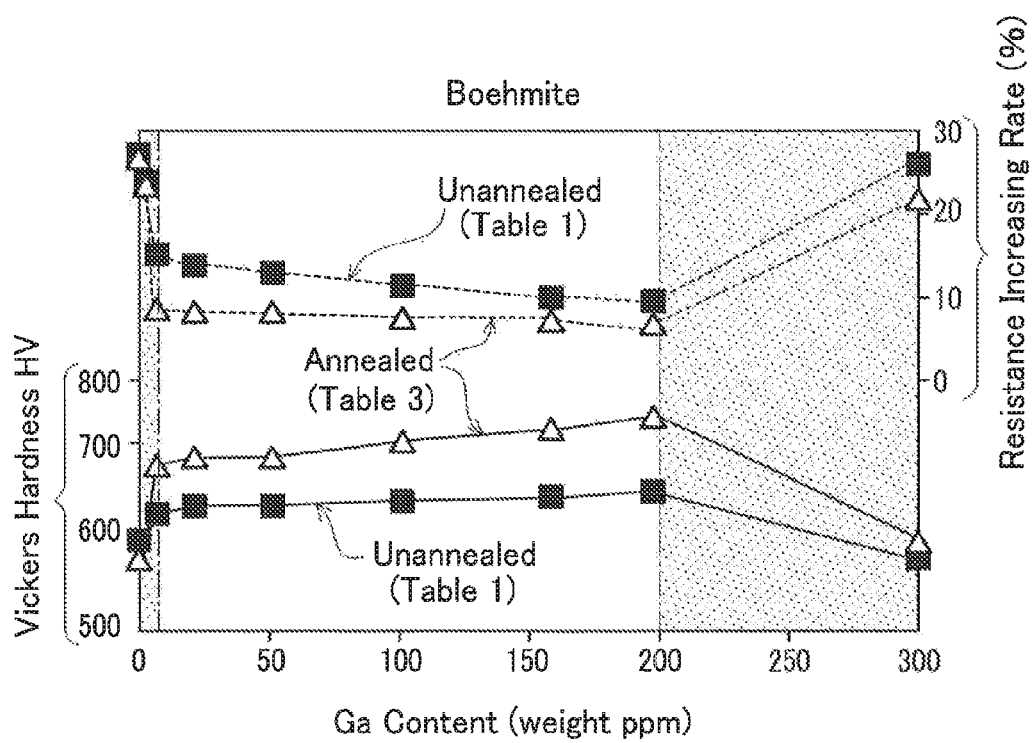
FIG. 7 is a graph showing effects of an annealing treatment in the embodiment.

Furthermore, it is found from comparison between Tables 1 and 3 using boehmite that the effect of the annealing treatment appears in the example in Table 3. This is explained based on a graph of FIG. 7. The graph of FIG. 7 is the plot of values of the HV and the resistance increasing rate in Tables 1 and 3 with respect to the gallium content. In this graph of FIG. 7, a horizontal axis indicates the gallium content, a left vertical axis represents HV and a right vertical axis represents resistance increasing rate.

From each plotted position in a range of 5 to 200 weight ppm of gallium content in the graph of FIG. 7, the following fact is proved. Referring to HV, firstly, the annealed samples are higher than the unannealed samples by comparison between the samples with the same gallium content. This is the effect of hardness increased by grain boundary segregation of gallium by annealing. In association with this, the resistance increasing rate is also superior, i.e., lower in the annealed samples than in the unannealed samples irrespective of gallium content. In the case of using alumina, even though it is not illustrated in a graph like FIG. 7, the same annealing effect as the boehmite can be achieved. The effect is clear by comparison between the results in Tables 2 and 4.

Although the temperature in the annealing treatment was set to 300° C. in the example of Table 3 and 900° C. in the example of Table 4, the temperature is not limited thereto. However, the annealing effect could not be achieved unless the temperature is high to a certain extent. Therefore, a lower limit temperature is 250° C. for boehmite and 850° C. for alumina. Since an overly high temperature causes the filler oxide to be dissolved, an upper limit temperature is 350° C. for boehmite and 950° C. for alumina. An annealing time of 12 hours in Tables 3 and 4 is one example. The annealing time is set in a range of 6 to 72 hours because a too short annealing time is ineffective but a too long annealing time may cause excessive segregation resulting in the same situation as in the case where the Ga content is excessive.

According to the battery in the present embodiment explained in detail above, there is used the boehmite or alumina, which is the inorganic oxide to be used as the filler of the heat-resistant layer, containing gallium at a content in a predetermined range. In the present embodiment, the filler of the heat-resistant layers 241 of the separators 24 containing an appropriate content of gallium is very high in hardness. Accordingly, the battery in the present embodiment is less likely to cause resistance increase due to fracture of the filler even when the battery undergoes high-rate charge and discharge. The present embodiment configured as above can realize the lithium ion secondary battery using the separators 24 having the heat-resistant layers 241 and being less likely to cause resistance increase even in use under high-rate condition, the separator, and the method for producing each of them. Furthermore, the filler are subjected to the annealing treatment at a stage prior to the kneading step, so that the effect achieved by inclusion of gallium can be more strongly obtained.

The above embodiment is a mere example and does not give any limitations to the present invention. Thus the present invention may be embodied in other specific forms without departing from the essential characteristics thereof. For instance, the filler containing gallium used in the above embodiment is boehmite or alumina produced as initially containing a predetermined quantity of gallium. Alternatively, gallium may be added in a later treatment to boehmite and alumina initially containing no gallium. Of course, the size and the shape of each part, each row material used in the above embodiment are arbitrary. Although the examples shown in Tables 1 to 4 are test results on the cylindrical battery 101, the same results are obtained even on the flat-shaped battery 100. The electrode body of the flat-shaped battery is not limited to an electrode wound body formed of electrode sheets and others wound together and may be an electrode lamination body formed of electrode sheets and others laminated in a planar fashion.

The invention claimed is:

1. A lithium ion secondary battery comprising an electrode body including a positive electrode sheet and a negative electrode sheet laminated by interposing a separator therebetween, and a non-aqueous electrolytic solution impregnated in the electrode body, the positive electrode sheet having active material containing lithium complex oxide, and the non-aqueous electrolytic solution containing lithium ions, wherein the separator has a heat-resistant layer containing inorganic oxide particles and a binder on at least one surface, and the inorganic oxide particles have a component containing gallium in a range of 5 to 200 weight ppm in aluminum oxide.

2. The lithium ion secondary battery according to claim 1, wherein the gallium contained in the inorganic oxide particles is segregated in a crystal grain boundary of the aluminum oxide.

3. A separator to be laminated together with a positive electrode sheet and a negative electrode sheet of a lithium ion secondary battery to form an electrode body, wherein the separator includes a heat-resistant layer containing inorganic oxide particles and a binder on at least one surface, and the inorganic oxide particles have a component containing gallium in a range of 5 to 200 weight ppm in aluminum oxide.

4. The separator according to claim 3, wherein the gallium contained in the inorganic oxide particles is segregated in a crystal grain boundary of the aluminum oxide.

5. A method for producing a lithium ion secondary battery comprising an electrode body including a positive electrode sheet and a negative electrode sheet laminated by interposing a separator therebetween, and a non-aqueous electrolytic solution impregnated in the electrode body, the positive electrode sheet having active material containing lithium complex oxide, and the non-aqueous electrolytic solution containing lithium ions, wherein the method includes:

a step of forming a heat-resistant layer containing inorganic oxide particles and a binder on at least one surface of a base film of the separator;

a step of producing the electrode body by laminating the positive electrode sheet and the negative electrode sheet by interposing therebetween the separator formed with the heat-resistant layer; and a step of placing the electrode body in a battery case and injecting the non-aqueous electrolytic solution into the battery case, and the inorganic oxide particles to be used have a component containing gallium in a range of 5 to 200 weight ppm in aluminum oxide.

6. The method for producing a lithium ion secondary battery according to claim 5, wherein the inorganic oxide particles to be used are subjected to an annealing treatment before subjected to the step of forming the heat-resistant layer.

7. A method for producing a separator to be laminated together with a positive electrode sheet and a negative electrode sheet of a lithium ion secondary battery to form an electrode body, wherein the method includes:

a step of forming a heat-resistant layer containing inorganic oxide particles and a binder on at least one surface of a base film of a separator, and the inorganic oxide particles to be used have a component containing gallium in a range of 5 to 200 weight ppm in aluminum oxide.

8. The method for producing a separator according to claim 7, wherein the inorganic oxide particles to be used are subjected to an annealing treatment before subjected to the step of forming the heat-resistant layer.

\* \* \* \* \*